United States Patent [19]

Coats

[11] 4,235,941

[45] Nov. 25, 1980

[54] MEAT PRODUCT

[75] Inventor: Hector A. Coats, Folcroft, Pa.

[73] Assignee: Keystone Foods Corporation, Folcroft, Pa.

[21] Appl. No.: 847,674

[22] Filed: Nov. 1, 1977

[51] Int. Cl.² ............................................. A23L 1/31
[52] U.S. Cl. .................................. 426/646; 426/104; 426/513; 426/523
[58] Field of Search ............... 426/104, 144, 249, 646, 426/383, 513, 523; 17/32; 425/408; 99/388, 372, 376, 430, 439

[56] References Cited

U.S. PATENT DOCUMENTS

| | | | |
|---|---|---|---|
| 2,246,719 | 6/1941 | Burnham, Jr. | 99/388 |
| 2,274,250 | 2/1942 | Simpkins | 426/513 |
| 2,670,296 | 2/1954 | Tansley | 426/513 |
| 2,771,366 | 11/1956 | Shadid | 17/32 |
| 2,798,814 | 7/1957 | Rivoche | 426/646 X |
| 2,806,247 | 9/1957 | Shadid | 17/32 |
| 2,827,659 | 3/1958 | Rabun | 17/32 |
| 3,863,020 | 1/1975 | Robinson | 426/646 X |
| 3,934,050 | 1/1976 | Hawkins | 426/513 |
| 4,026,201 | 5/1977 | Fetzer | 99/388 |

*Primary Examiner*—Robert A. Yoncoskie
*Attorney, Agent, or Firm*—Weiser, Stapler & Spivak

[57] ABSTRACT

A slab of compacted, frozen comminuted meat has grooves formed in at least one surface. It is cooked on a flat grill, grooves downward, to flatten the grooves and predominantly caramelize the spaces between grooves.

13 Claims, 7 Drawing Figures

MEAT PRODUCT

This invention relates to meat products before, during and after their final preparation for immediate consumption. One of the most highly regarded meat dishes is charcoal broiled steak, i.e. steak which has been cooked over a charcoal fire, while resting on a grid of supporting rods. The reasons for this popularity are believed to include the particular flavor of the cooked product, its consistency, and possibly other desirable characteristics which the public tends to attribute to the method by which it is cooked.

It appears that these desirable attributes are initially evoked in the mind of the consumer by the mere visual appearance of charcoal broiled steak, even before its consumption is begun. As is well known, this appearance is quite distinctive, being characterized by alternate strips of relatively light and relatively dark, brownish surface coloration. This pattern is formed during the charcoal broiling process. The relatively light strips are in those portions of the steak which are unsupported by the grid rods and are therefore exposed to the open fire during broiling. The relatively dark strips are in those portions which rest upon the grid rods supporting the steak above the fire during broiling. In those grid-supported regions, the steak is subjected to a searing effect, which darkens its surface more rapidly than the direct exposure to the charcoal fire.

Unfortunately, charcoal broiled steak also is subject to certain handicaps which seriously limit its availability to the public.

The first and foremost of these is the fact that only a limited portion of any beef carcass contains the kind of meat cuts which are suitable for use as charcoal broiled steaks. The reasons why this is so are too well known in the meat processing industry to warrant repeating here. Suffice it to say that this scarcity of suitable cuts, relative to other meat products which can be derived from the same carcass, makes charcoal broiled steak a comparatively high-cost item, thereby limiting its consumption.

Another handicap lies in the cooking process itself. This process is relatively slow and difficult to control with accuracy. The equipment needed is different from conventional cooking equipment. Burning charcoal emits gases which must be vented. The charcoal once set on fire cannot be conveniently extinguished after the cooking is complete. The charcoal residues are awkward to dispose of, and so forth. Coping with all this is not only a problem in itself, but also raises the ultimate cost.

All of these handicaps are particularly serious for commercial establishments, and increasingly so to the extent that these cater to a mass market, where low cost and convenient, quick preparation play a decisive role.

In practice, these twin considerations of cost and convenience have effectively precluded such establishments, and particularly the so-called "fast food" restaurants, from including charcoal broiled steak in their menu offerings.

The present invention constitutes a giant step forward in this field. It provides a technique for producing a dish which, although not true charcoal broiled steak, nevertheless has enough of the attributes which consumers associate with such steak as to constitute a highly acceptable and even desirable product in its own right. This inventive technique extends all the way back to the assembly of raw ingredients which form the product, and includes every stage from there on, until it is cooked and ready to be consumed.

Accordingly it is an object of the invention to provide a new and improved technique for producing a meat product.

It is another object to provide such a technique which produces a meat product having certain characteristics which are associated with charcoal broiled steak.

It is still another object to provide such a technique which is comparatively economical.

It is still another object to provide such a technique which is convenient to use.

It is still another object to produce a meat product utilizing the technique.

Briefly, these and other objects which will appear are achieved in accordance with the invention, as follows.

From raw meat which has been comminuted into elongated, fiber-like particles, there is compacted at freezing temperature a slab of meat product which is preferably also given the over-all shape of a steak.

During the compacting there is impressed into at least one surface of the slab a pattern of spaced-apart recesses. Preferably, these are in the form of parallel grooves separated by ungrooved portions of widths comparable to those of the grooves.

For cooking, the frozen slab is placed on a flat, heated plate (commonly referred to as a "grill"). There it is processed in the same basic manner as other meat products conventionally cooked on such a grill.

The end product is a meat dish, which strongly resembles a conventional charcoal broiled steak, but which can be sold at a much lower price.

For further details, reference is made to the discussion which follows, in light of the accompanying drawings wherein.

The same reference numerals are used in the different Figures to denote corresponding elements.

Figure 1:
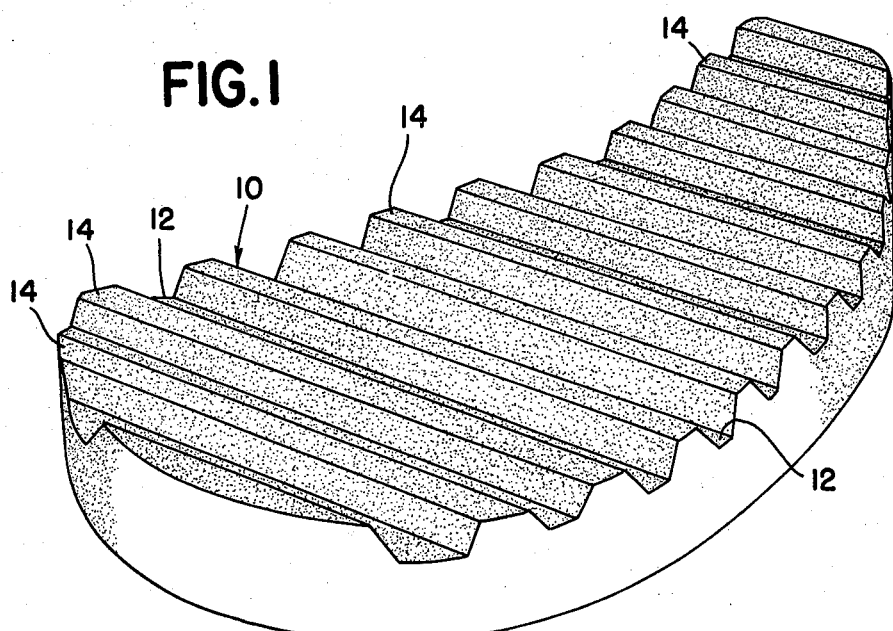
FIG. 1 is an isometric view of a meat product embodying the invention at one stage in the processing.
Figure 2:
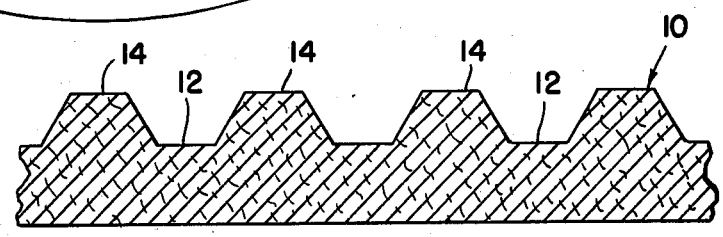
FIG. 2 is a cross-sectional elevation through the product taken along line II—II in FIG. 1.

Referring to FIGS. 1 and 2, these show a slab 10 of the meat product, embodying certain essential features of the invention.

First, the slab 10 has the general, over-all configuration of a steak. This means that it has a thickness such as generally associated with steak, it is generally oval, but wider at one end than the other, and it also exhibits the slight lengthwise curvature which is often characteristic of steak.

However, slab 10 does not consist of a single piece of beef, cut from the carcass. Rather it consists of firmly compacted particles of meat, and these particles are preferably not granular (as in ground beef) but elongated or fiber-like. This characteristic of the slab is diagrammatically indicated in FIG. 2 by appropriate cross-sectioning. It has been found that this fiber-like characteristic contributes to the steak-like consistency (or "bite") of the ultimately consumed product.

Moreover the slab 10 is initially in the frozen state. This not only serves the conventional purpose of preservation, but also other purposes in accordance with the invention, as will appear below.

The slab 10 further is characterized in accordance with the invention by a series of grooves 12, paralleling each other across the width of the slab, and spaced from each other by portions of ungrooved slab surface, forming lands 14. This pattern of alternating lands and grooves is preferably distributed substantially uniformly over the slab.

Further in accordance with the invention the raw (and frozen) meat slab of FIGS. 1 and 2 is then transformed into a cooked, consumable meat product. Three consecutive stages in this process are somewhat diagrammatically illustrated in FIGS. 3, 4 and 5.

Figure 3:
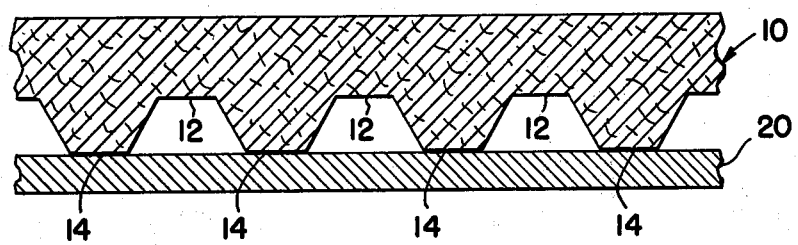
FIGS. 3, 4 and 5 show the same view as FIG. 2, but at progressively later stages in the processing.

During all of these stages, the slab 10 rests on a conventional, flat grill 20, with the side having the lands and grooves 14, 12 facing the grill. The initial condition is shown in FIG. 3. The grill is, of course, heated to conventional grill cooking temperatures by conventional means (not shown), e.g. gas flames.

What happens then is that the heat from the grill 20 is transmitted to the slab 10, which is thereby gradually transformed into a cooked, consumable product.

Figure 4:
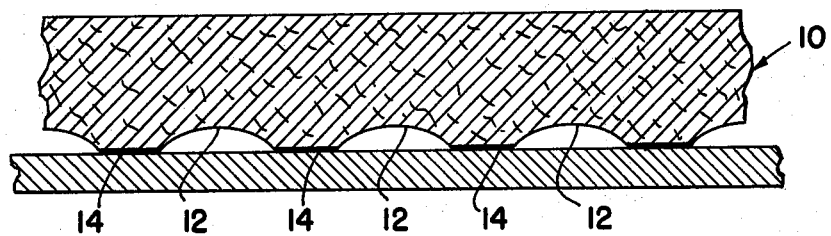

In an intermediate stage in this process shown in FIG. 4, the lands 14 have already become somewhat cooked, whereas the grooves 12 have become cooked to a less advanced degree, if at all. However, these grooves have at this stage already begun to loose their initial grooved configuration, due to the combined effect of thawing under the heat from the grill, and gravity and expansionary forces urging the meat downwardly toward the grill. At the same time, the direct contact of grill and lands 14, produces a type of searing effect, which causes rapid, pronounced darkening (so-called "caramelizing") of the slab 10 in those areas. Not so for the grooves 12, which become darkened to a much less pronounced degree. In the cross-sectional views of FIGS. 3, 4 and 5, these degrees of darkening have been diagrammatically represented by correspondingly different thickening of the lines which define the different portions of the slab surface.

Figure 5:
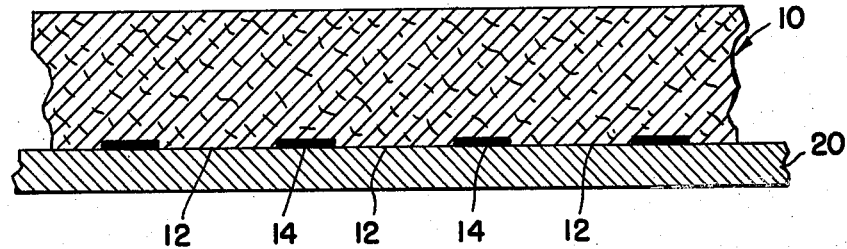

In FIG. 5, this process is essentially completed, with the surface of slab 10 which rests on the grill 20 now substantially flat, and exhibiting alternate strips of lighter and darker coloring where the grooves and lands were initially located.

Figure 6:
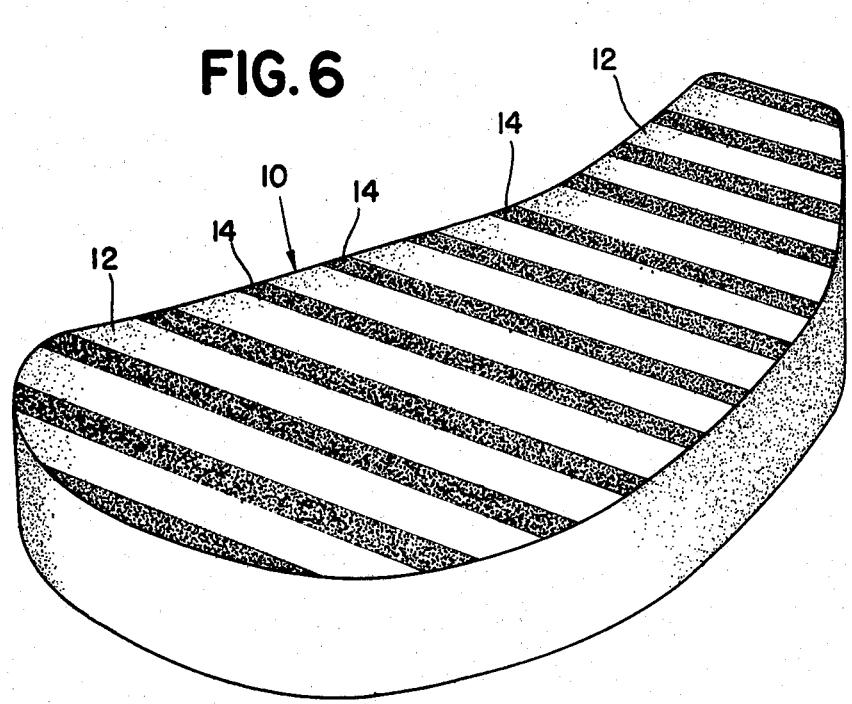
FIG. 6 shows the meat product of FIG. 1 at the end of the processing.

FIG. 6 shows the same slab as FIG. 1, but at the end of the above-described processing.

The remarkable resemblance to charcoal broiled steak is believed to be clearly apparent in FIG. 6.

It will be understood that the same slab 10 is preferably also cooked as required from the opposite side, to insure cooking-through of the entire slab thickness. This reverseside cooking is preferably performed after the procedure described above with reference to FIGS. 3, 4 and 5.

In a practical instance, we have found that a suitable set of conditions is the following.

The grill is maintained at about 400° F.

After the slab is placed on the grill (FIG. 3) it is cooked for about 2 minutes and 50 seconds. After about the first twenty seconds of this cooking time period the slab is pressed down against the grill with a spatula in order to quickly sear it in the portions 14. At the end of this cooking time period stated above, the slab is turned over and left on the grill for about a further 2 minutes.

It will be understood that these cooking parameters may be varied to suit various meat thicknesses, grill temperatures, and other variables.

The groove-and-land configuration may also be varied within wide limits.

The widths of the grooves and lands are essentially chosen to simulate the pattern of alternating lighter and darker surface strips resulting from actual charcoal broiling. Typical dimensions would be about ½ inch edge-to-edge for each groove 12 and about the same or a little lesser value for each land 14.

As for groove depth, this should be sufficient to maintain the interior groove surfaces spaced from the grill during a substantial fraction period during which the slab is cooked on its grooved side. Thus, in a slab about ¾ inch thick, a groove depth of about ⅜ inch may be suitable.

The cross-sectional shape of the grooves may be as shown, or it may be curved or more nearly triangular. The shape shown is particularly convenient to produce during molding of the slab in the frozen state.

Such molding may be accomplished in any conventional way, as by compression of a suitable portion of comminuted meat between pressure plates.

The forming of the fiber-like particles which are then compacted may also be carried out in any conventional manner, e.g. by a machine known in the trade as a "Commitrol", and available from Urschel Laboratories.

Figure 7:
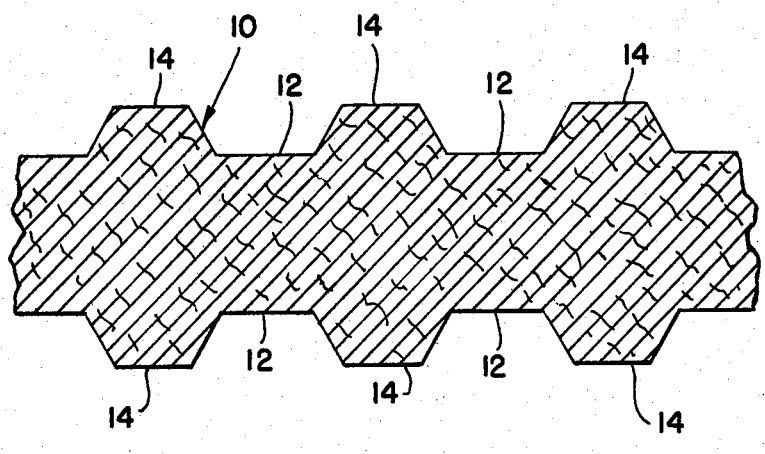
FIG. 7 is a view similar to that of FIG. 2, but of a different embodiment of meat product according to the invention.

Both sides of the slab may be provided with a land-and-groove pattern, as shown in FIG. 7. This has the advantage that the slab may be initially placed on the grill with either side facing downwardly toward the grill. However, it is manifestly also within the scope of the invention to apply the land-and-grooves treatment to only one face of the slab, as in FIGS. 1 through 6. Preferably the grooves are made deeper in that case, relative to the total thickness.

In either case, the final pattern of alternate strips of lighter and darker coloring is pronounced on the side of the slab which was initially positioned facing the grill. For consumption, the finished meat dish is therefore preferably presented with that side of the slab visible to the consumer.

Land-and-groove configurations may also be used which are still other than those illustrated in the drawings.

For example, the parallel grooves 12 may be oriented at a diagonal to the length of the slab 10. They may be formed in a diamond pattern, and so forth.

Still other variations will readily occur to those skilled in the art without departing from the inventive concept.

The cooking process does not necessarily proceed to a point at which the initially grooved portions 12 are substantially in the same plane as the initially ungrooved portions 14. Rather the latter may continue to protrude somewhat, even at the end of the cooking process. This does not detract from the finished product since the surface of charcoal broiled steak is also not always completely smooth.

Still other variations will readily occur to those skilled in the art without departing from the inventive concept.

It is also noted that the cooked consumable product provided in accordance with the invention not only has much of the consumer appeal of charcoal broiled steak, but in some ways is actually superior.

For example, the uniformity of the product from one serving to another can be higher than in conventional steak.

The uniformity within a single portion can also be higher.

The product according to the invention is easy to chew, and not subject to the undesired presence of large pieces of gristle, tendons, and other inedible components which may be present in conventional steak.

Even seasoning can be "built" right into the product, if desired.

The initial frozen slabs, with grooves impressed therein, also present advantages in terms of packaging and handling. For example, several of them may be packaged by being positioned with their broad sides immediately adjacent each other, within a box, or a compartment of a box. Under these circumstances, there could be a tendency for adjacent slabs to congeal together. This would make it difficult to separate them without damaging their overall configuration, were it not for the presence of the alternating groove-and-land configuration in accordance with this invention. Due to this configuration, it remains feasible to separate such slabs, without having to exercize forces strong enough to damage their individual configurations.

Additional benefits such as these further enhance the already remarkable basic merits of the invention.

I claim:

1. A method of preparing a consumable meat product resembling a charcoal broiled steak, comprising
   providing a slab of compacted meat particles,
   forming in at least one surface of the slab a plurality of spaced-apart grooves separated by lands, the grooves extending across the slab from one edge of the slab to the opposite edge, said slab being in the frozen state,
   placing the slab in its frozen state upon a continuous heated cooking plate, with the lands resting on the plate, and
   subjecting the slab so placed to the heat from the plate
   until the grooves have substantially flattened out against the plate, and the lands have darkened to a more pronounced degree than the flattened grooves.

2. The method of claim 1 wherein the slab is provided in a shape longer than it is wide, and the grooves are formed so as to extend substantially transversely to the length of the slab.

3. The method of claim 2 wherein the grooves are formed substantially equally spaced from each other along the slab.

4. The method of claim 3 wherein the grooves are formed with a spacing of about one inch.

5. The method of claim 1, which comprises forming spaced-apart grooves separated by lands in both surfaces of the slab.

6. The method of claim 5 wherein the grooves in one surface of the slab are formed in substantial alignment with the grooves in the other surface.

7. The method of claim 1 wherein the shape in which the slab is provided is wider at one end than at the other.

8. The method of claim 1 wherein the grooves have substantially flat bottoms which are substantially equal in width to the lands.

9. The method of claim 8 wherein pressure is applied to the slab immediately after placing it upon the plate to promote caramelizing of the lands while the grooves are flattening out.

10. A method of preparing a consumable meat product resembling a charcoal broiled steak from a slab of compacted frozen meat particles, the slab having in at least one of its surfaces a plurality of spaced-apart grooves, the grooves extending across the slab from one edge to the opposite side, the method comprising
    placing the slab in its frozen state upon a heated cooking plate, with the surface having the grooves facing the plate, and
    subjecting the slab so placed to the heat from the plate
    until the grooves in that surface have substantially flattened out against the plate, while the portions of that surface between the grooves have darkened to a more pronounced degree than the flattened grooves.

11. The method of claim 10 further comprising
    applying pressure to the opposite surface of the slab after placing the slab on the plate.

12. The method of claim 11 wherein
    the pressure applying is discontinued before the end of the heat subjecting.

13. The method of claim 10 further comprising
    turning the slab over,
    placing it on the cooking plate with its opposite surface facing the plate, and
    carrying the cooking to completion in the last-named position.

* * * * *